Feb. 14, 1928.
H. W. HENDRICKS
1,659,466
TURN SIGNAL DEVICE FOR VEHICLES
Filed Feb. 7, 1927
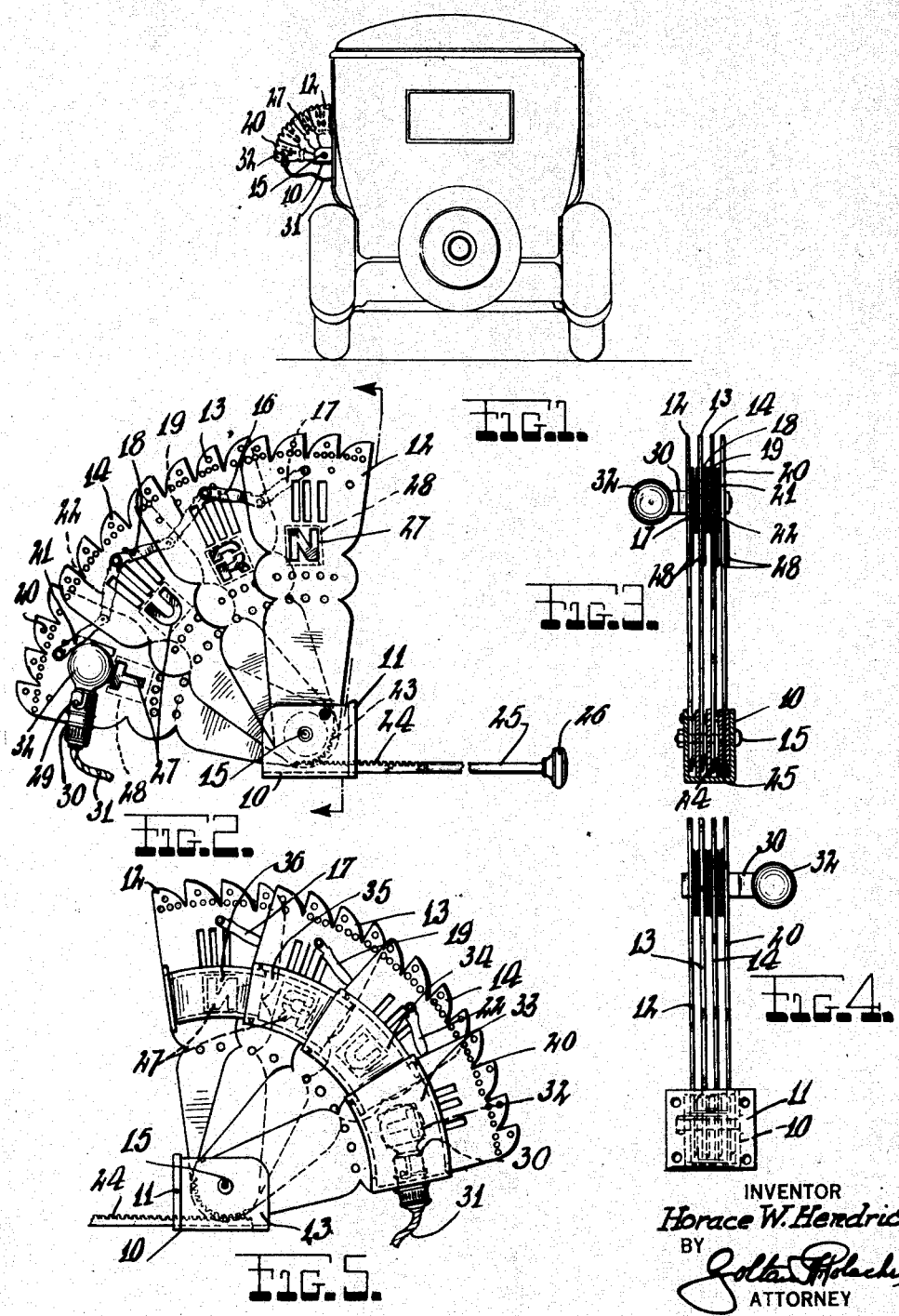
INVENTOR
Horace W. Hendricks
BY
ATTORNEY Patented Feb. 14, 1928.

1,659,466

UNITED STATES PATENT OFFICE.

HORACE W. HENDRICKS, OF NEW YORK, N. Y.

TURN-SIGNAL DEVICE FOR VEHICLES.

Application filed February 7, 1927. Serial No. 166,387.

This invention relates to improvements in signals particularly adapted to be mounted upon a vehicle so as to permit the driver of the vehicle to let know to the drivers of vehicles or pedestrians to the rear of the vehicle that he intends to turn. The invention is adapted to be mounted at or near the driving seat of the vehicle and is readily operable by the hand to extend the same. A light is provided at the end of the signal whereby it can readily be seen in the dark.

A further object of the invention is to provide a signal device of novel construction and arrangement of parts, hereinafter more fully described, claimed and illustrated in the accompanying drawing.

Fig. 1 is a rear elevational view of a motor vehicle showing my improved device mounted thereon.

Fig. 2 is a detail front elevational view of my improved device, in an extended position.

Fig. 3 is a side elevational view thereof.

Fig. 4 is a similar view illustrating a modification of my improved device.

Fig. 5 is a rear elevational view, in an extended position, illustrating a further development of my improved device.

As here embodied my improved device comprises a supporting member 10, preferably of U shaped construction, having attached thereto a plate member 11, as a means of attaching my improved signal at a point on the vehicle at or near the driving seat thereof. The blade member 12, is rigidly attached to the supporting member 10, and is extended vertically upward therefrom. The intermediate blade members 13 and 14 are pivotally attached, as at 15, by a bolt, stud, or the like, carried in the supporting member 10, and are extended upwardly thereof. The intermediate blade member 13, is hinged, as at 16 and 17, by link members, hinged intermediate thereof, and pivotally attached, at their extremities to the intermediate blade member 13 and to the blade member 12. The intermediate blade member 14, is similarly hinged, as at 18 and 19, to the intermediate blade member 13. The lower blade member 20, is pivotally attached by the above mentioned bolt 15 to the supporting member 10, and is extended outwardly therefrom. The lower blade member 20, is hinged, as at 21 and 22, by similar link members, hinged intermediate thereof, and pivotally attached, at their extremities to the lower blade member 20 and to the intermediate blade member 14. The lower blade member 20 is provided with teeth 23, cut or arranged similarly to the the teeth of a segment gear, and adapted to engage teeth cut or formed in the rack bar 24, slidably mounted in the supporting member 10, and extended therefrom. The handle member 25 is attached to the rack bar 24, and is extended therefrom, and has attached at its extended extremity a knob 26 or handle.

The above described construction being such as will permit the above mentioned blade members 13, 14 and 20 to be pivotally extended, as clearly shown in Fig. 2 when the knob 26 is pulled or forced outwardly.

The above mentioned blade members 20, 14, 13, and 12 may be of any desired contour or design, so as to provide an ornamental device, which will attract ready attention. The blade members 20, 14, 13 and 12, have stenciled, or cut therein, respectively, the letters "T" "U" "R" "N", as designated by the reference numeral 27. The transparent members 28, preferably of green colored celluloid, are attached to the rear of the blade members 20, 14, 13 and 12, directly in the back of the above referred to letters "T" "U" "R" "N". The electric light socket 29, is attached to the bracket 30, carried by, and extended outwardly in front of the lower blade member 20. The electric light socket 29, is connected by means of the electric light wire 31, or cable, to any convenient suitable source of electric power, preferably the storage battery such as ordinarily provided to supply electric current to the electric lights carried by the motor vehicle. The electric light socket 29, is adapted to removably carry the electric light bulb 32. The above described construction being such as will permit my improved signal to be lighted at night.

In Fig. 3, I have shown the electric light bulb 32, positioned at the rear of the lower blade member 20, so as to reflect light through the transparent members 28, so as to render the letters "T" "U" "R" "N" plainly visible at night.

In Fig. 5, of the accompanying drawing, I have shown the electric light bulb 32, positioned in the casing 33, attached to the rear of the lower blade member 20, positioned directly over the above mentioned letter "T". Similar casings 34, 35 and 36 are attached to the blade members 14, 13 and 12, respectively, and are positioned over the letters "U" "R" "N" respectively. The casings 33, 34, 35 and 36, are formed or shaped, segmentary and are adapted to engage with each other, or to telescope, when my improved signal is in a closed position. The above described construction is such as will confine the light from the electric light bulb 32, so as to more clearly illuminate the letters "T" "U" "R" "N" when my improved device is in an open or extended position.

Having thus described my invention, what I claim as new and desire to protect by Letters Patent of the United States is as follows:

1. A device of the class described comprising a bracket adapted to be attached to an automobile, a blade rigidly attached to said bracket in upright vertical position, a plurality of blades disposed rearwardly of said rigidly mounted blade and pivotally mounted on said bracket, each of said blades being provided with an aperture, transparent letters mounted in said apertures, arcuately formed casing sections mounted on the forward side of said blades, said casings being adapted to telescope into each other when said blades are in vertical upright position and to provide a continuous arcuate encasement for confining rays of light when said blades are rotated to inclined extended position, an electric bulb mounted in the casing section of the forward blade adapted to emit light into said casing for rendering the transparent letters of said blades visible at night, and actuating mechanism for rotating said blades from vertical to inclined positions.

2. A device of the class described comprising a plurality of pivotally mounted blades adapted to be positioned in superimposed vertical relation and to be moved to extended inclined position, each of said blades being provided with an aperture, transparent letters mounted in said apertures, casing sections having opposite closed ends mounted on the forward and rear blades, casing sections having open ends mounted on the intermediate blades, said casing sections being of suitable size to telescope into each other and into the first-mentioned casing section of the forward blade and to be extended relative to each other for forming a continuous arcuate encasing on the forward side of said blades, and an electric bulb mounted on the closed end of said forward casing section for emitting light into said arcuate encasing for rendering said transparent letters visible at night.

3. A signal device for vehicles comprising a bracket, a plurality of blades pivotally mounted on said bracket, transparent letters mounted in apertures of said blades, and a plurality of casing sections mounted on the forward side of said blades adapted to telescope into each other when said blades are in vertical superimposed relation and to form an arcuate continuous encasement when said blades are in inclined position for directing rays of light upon said transparent letters.

In testimony whereof I have affixed my signature.

HORACE W. HENDRICKS.